United States Patent [19]

Ishikawa

[11] Patent Number: 4,904,871
[45] Date of Patent: Feb. 27, 1990

[54] METHOD OF DETERMINING RADIOACTIVITY OF LOW ENERGY BETA RAYS

[75] Inventor: Hiroaki Ishikawa, Tokyo, Japan
[73] Assignee: Japan Science, Inc., Tokyo, Japan
[21] Appl. No.: 253,977
[22] Filed: Oct. 5, 1988
[30] Foreign Application Priority Data Oct. 12, 1987 [JP] Japan .................. 62-254555

[51] Int. Cl.$^4$ .......................................... G01T 1/20
[52] U.S. Cl. ................................. 250/364; 250/328
[58] Field of Search .......................... 250/364, 328
[56] References Cited

U.S. PATENT DOCUMENTS 4,700,072 10/1987 Oikari et al. ...................... 250/328
4,761,555 8/1988 Ishikawa ........................... 250/328

FOREIGN PATENT DOCUMENTS 0174284 3/1986 European Pat. Off. .
85/03779 8/1985 World Int. Prop. O. .

OTHER PUBLICATIONS

Hiroaki Ishikawa, Makoto Takiue and Tamaru Aburai, "Radioassay by an Efficiency Tracing Technique Using a Liquid Scintillation Counter." Int. J. Appl. Radiat. Isot., vol. 35, No. 6, pp. 463–466. Copyright © 1984 Pergamon Press, Ltd.

Primary Examiner—Constantine Hannaher
Attorney, Agent, or Firm—Koda & Androlia

[57] ABSTRACT

This invention is a technique to determine radioactivity of low energy beta emitters using liquid scintillator. Corrections for regression equations which represent the relationship between counting efficiency of a standard and counting rate of a sample make it possible to obtain the radioactivity of the low energy beta emitters. It is very difficult for the emitters to be measured with the conventional efficiency tracing technique.

4 Claims, 4 Drawing Sheets

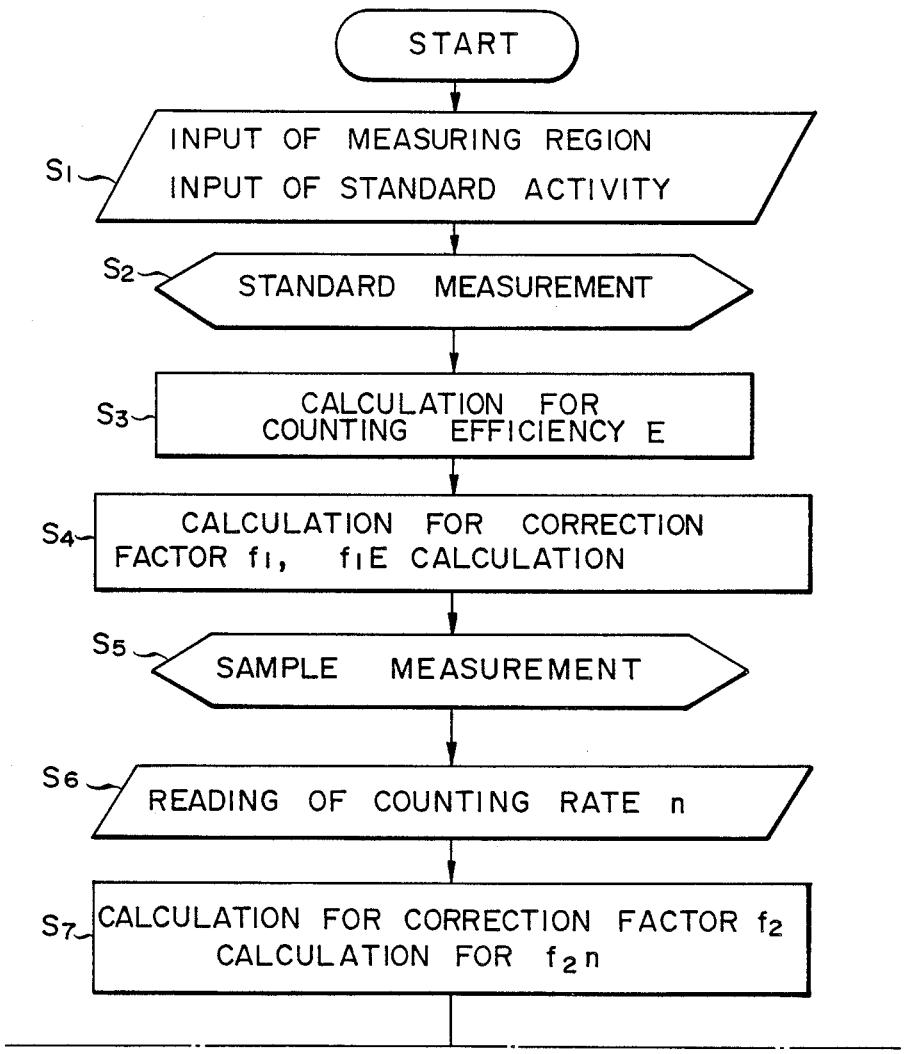

METHOD OF DETERMINING RADIOACTIVITY OF LOW ENERGY BETA RAYS

BACKGROUND OF THE INVENTION

1. Field of the Invention

This invention relates to a radioactivity measurement method, especially to a method of determining radioactivity of low energy beta rays.

2. Description of the Prior Art

For thirty years nuclides whose radioactivities can be measured with a liquid scintillation counter were limited practically to tritium and carbon-14. External standard and sample channel ratio methods have been used to determine radioactivities of these two nuclides with the counter. These methods need a set of quenched standards which contain the same amount of radioactivity and differ in quenching strength. Radioactivity of a sample to be measured is determined through a quenching correction curve constructed from the quenched standards. However, only the quenched standards used for tritium and carbon-14 are commercially available, other kinds being not sold owing to the short life of the radioactivity. Furthermore it is rather difficult to prepare them for oneself.

From the above point of view, only radioactivity for tritium or carbon-14 is obtainable, but other nuclides were confined to find only their counted values.

An automatic efficiency tracing technique which eliminates the foregoing inconvenience and makes it possible to measure radioactivities of various pure beta and beta-gamma emitters have been recently developed (references: H. Ishikawa, et al.: Int. J. Appl. Radia. Isot. Vol. 35, 463 (1984); U.S. Pat. No. 4,761,555).

The conventional automatic efficiency tracing technique has the following contents. FIG. 1 illustrates a spectrum 1 of a standard and a spectrum 2 of a sample to be measured in a memory of a multichannel pulse height analyzer installed inside the liquid scintillation counter. In the FIG. 1, letting channel numbers of lower and upper levels be $N_l \ldots N_m$ and $N_u$, and letting counting efficiencies of the standard in each measuring region $N_l\text{-}N_u \ldots N_m\text{-}N_u$ be $E_l \ldots E_m$ (%), and further counted values of the sample be $n_l \ldots n_m$ (cpm), the relation between E and n is expressed in the following regression equation;

$$n = a_l E_l^2 + b E_l + c_l \qquad (1)$$

where $a_1$, $b_1$ and $c_1$ are constant.

In the FIG. 1, a region capable of practical measurement is confined to over sensitive level (it is herein supposed to be $N_l$), and a region under the level is not measurable. However, radioactivity of the sample is found by obtaining the total area of the spectrum which lies from null to infinity. Counting rate of the sample at counting efficiency 100% in the regression equation (1) means radioactivity of the sample. Namely, if a value at the counting efficiency 100% with respect to the standard can be found, a value (i.e. radioactivity) at that point with respect to the sample is also obtainable.

The situation to find the radioactivity of the sample as above described is illustrated by a regression curve 3 of FIG. 2, in which a crossing of the regression curve with a vertical axis means the radioactivity of the sample.

The conventional automatic efficiency tracing technique is very worthy of practical use for $\beta$-emitters whose energy is more than that of carbon-14. However, tritium is too low a beta energy emitter (maximum energy is 18.6 keV), and especially it was impossible to measure a quenched tritium sample with the conventional efficiency tracing technique because of narrow spectral distribution.

Since tritium is very often used and one of the most important nuclides, the above matter was a serious drawback of the conventional technique.

The conventional efficiency tracing technique requires a standard capable of giving a high counting efficiency enough to extrapolate up to a counting efficiency 100%. If the quenched tritium sample were measured using a standard which provides counting efficiency more than 90%, the spectral distribution of tritium would be very narrow compared with respect to that of the standard. Division of the quenched tritium spectrum into the conventional measuring regions unenables an efficient tracing technique to be carried out on account of very few measured values. Each measured value in more than at least five measuring regions is required based on measurement accuracy.

Otherwise, if neighboring lower levels closely approach so as to obtain a sufficient number of measuring regions, counting efficiencies of the conventional standard scarcely changes to show a regression curve 4 in FIG. 2. Such a short regression curve 4 never derives an accurate value, even though an extrapolated value up to the counting efficiency 100% is sought by means of equation (1).

SUMMARY OF THE INVENTION

In order to obtain a quadratic regression curve which extends over a wide region, a standard of less than maximum counting efficiency of 85% is required, unlike the conventional standard of more than 90%. A quadratic regression curve 5 in FIG. 3 is obtained by employing the standard and measuring regions for tritium. It is certained by experiment that an extrapolation of the regression curve 5 up to the counting efficiency 100% never derives accurate radioactivity, even if the quadratic regression equation (1) is used.

Accordingly, corrected counting efficiencies $f_l E_l \ldots f_l E_m$ which are obtained by multiplying counting efficiencies $E_l \ldots E_m$ of the standard for tritium by a correction factor $f_l$ lead to the following quadratic regression equation instead of the equation (1), $$n = a_2(f_l E)^2 + b_2(f_l E) + c_2 \qquad (2)$$

where $a_2$, $b_2$ and $c_2$ are constant.

Furthermore, after finding a correction factor $f_2$ regarding the sample to be measured, corrected counting rates $f_2 n_1 \ldots f_2 n_m$ which are products of counting rate $n_2 \ldots n_m$ and $f_2$ derive the following quadratic regression equation (3), $$f_2 n = a_3(f_1 E)^2 + b_3(f_1 E) + c_3 \qquad (3)$$

where $a_3$, $b_3$ and $c_3$ are constant.

The foregoing procedure is shown in FIG. 3. A regression curve 5 doesn't lead to accurate radioactivity because of too long of extrapolation up to the vertical axis implying the counting efficiency 100%. Therefore, now that a regression curve 7, which lies close to the vertical axis can be obtained by parallel movement of the regression curves 5 and 6 toward high counting efficiency and large counting rate, respectively, an accurate extrapolated value can be derived.

The correction factor $f_1$ is the ratio of counting efficiencies of the standard, and $f_2$ is that of counting rates of the sample in two measuring regions. $f_1$ and $f_2$ are specified to be $0.5 \leq f_1 \leq 2.0$ and $0.5 \leq f_2 \leq 2.0$, respectively.

The quadratic regression curve 7 is not always on an exactly prolonged line of the regression curve 5, but more or less on a deviated line. Hence, unlike the conventional efficiency tracing technique which never performs the parallel movement, radioactivity of the sample can't be found from a counting rate at counting efficiency 100% of the quadratic regression equation (3).

Therefore, a third correction is required. A correction factor $f_3$ which is the ratio of radioactivity of the standard to an extrapolated value found from the quadratic regression equation (3) is related, as follows, to the ratio R of counting rates in two measuring regions, $$f_3 = a_4 R^2 + b_4 R + c_4 \qquad (4)$$

where $a_4$, $b_4$ and $c_4$ are constant.

Multiplying the extrapolated value of the quadratic regression equation (3) by $f_3$ found from the quadratic regression equation (4) leads to accurate radioactivity of the sample.

The standard which gives low counting efficiency compared to the standard used for the conventional efficiency tracing technique has to be used for determination of tritium radioactivity. However, the use of such a standard makes it difficult to get an accurate extrapolated value. To remove this difficulty, we have to get the quadratic regression equation (2) by multiplying the quadratic regression equation (1) by the correction factor $f_1$, and then to obtain the quadratic regression equation (3) by multiplying by $f_2$.

A value at counting efficiency 100% of the quadratic regression equation (3) is corrected by the correction factor $f_3$ derived from the quadratic regression equation (4) to obtain a final radioactivity.

This invention is different from the conventional efficiency tracing technique, as follows.

Owing to the use of a standard giving high counting efficiency, the conventional technique requires no correction, enabling radioactivity of a sample to be obtained by the quadratic regression equation (1). However, it is impossible to determine the radioactivity of quenched tritium sample by means of the conventional efficiency tracing technique.

Since this invention requires a standard providing comparatively low counting efficiency, tritium radioactivity can't be found from only the quadratic regression equation (1). The use of three kinds of correction factors makes it possible, for the first time, to determine accurate radioactivity of quenched tritium sample.

In addition, according to this invention, a mixed sample of tritium with carbon-14 also can be analytically measured to find each radioactivity.

BRIEF DESCRIPTION OF THE DRAWINGS

FIGS. 4A and 4B are a flow charts for computer processes.

DESCRIPTION OF THE PREFERRED EMBODIMENT

Figure 1:
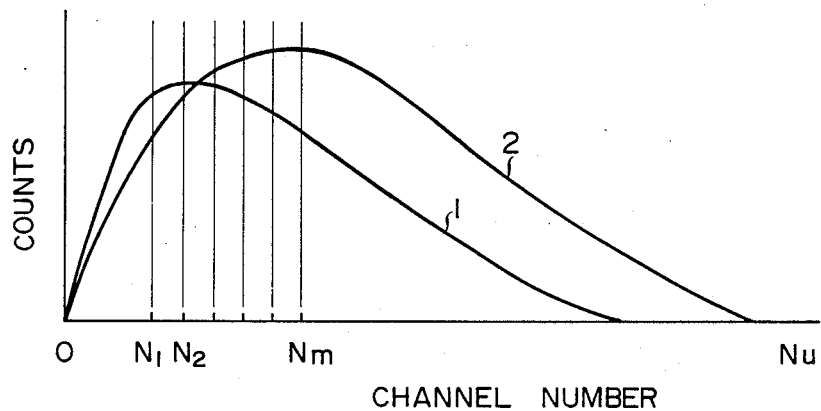
FIG. 1 is spectra of a standard and a sample to be measured, which represent measuring regions.
Figure 2:
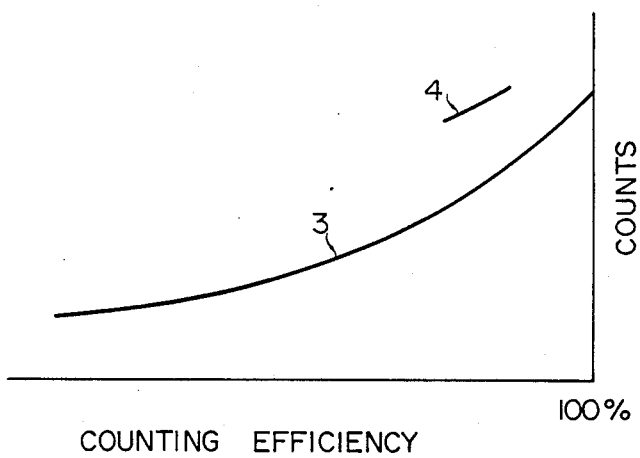
FIG. 2 shows two regression curves of the sample.
Figure 3:
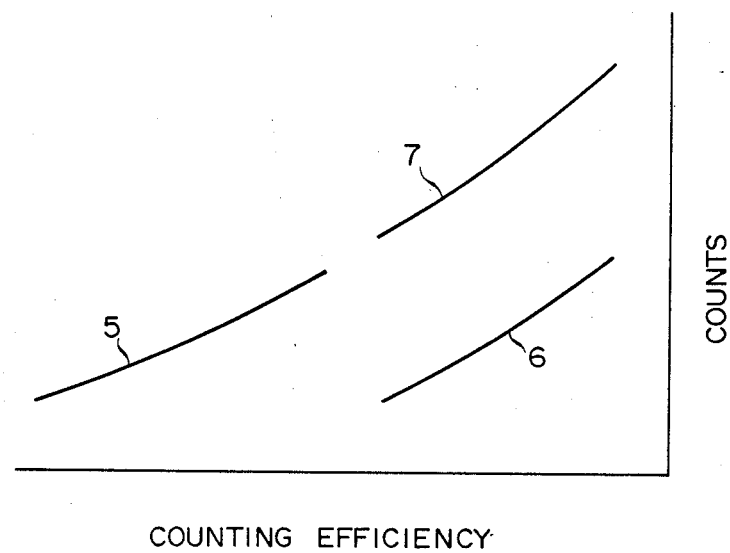
FIG. 3 shows parallel movements of regression curves.

Counting efficiencies of the standard and counting rates of the sample in each measuring region are listed in TABLE 1. The ratio of the counting efficiencies of No. 1 to No. 7 means the correction factor $f_1$, which is equal to 1,417, and similarly the ratio of the counting rates is $f_2$ equal to 1,271. Counting efficiencies and counting rates in TABLE 2 are corrected by multiplying values in the TABLE 1 by $f_1$ or $f_2$.

TABLE 1

| No. | Measuring region | Counting efficiency (%) | Counting rate (cpm) |
|---|---|---|---|
| 1 | 220–4000 | 65.86 | 124,008 |
| 2 | 330–4000 | 64.74 | 122,550 |
| 3 | 360–4000 | 63.92 | 121,482 |
| 4 | 390–4000 | 62.88 | 120,111 |
| 5 | 420–4000 | 61.60 | 118,417 |
| 6 | 450–4000 | 60.22 | 116,575 |
| 7 | 700–4000 | 46.46 | 97,501 |

TABLE 2

| No. | Measuring region | Corrected Counting efficiency (%) | Corrected Counting rate (cpm) |
|---|---|---|---|
| 1 | 220–4000 | 93.37 | 157,680 |
| 2 | 330–4000 | 91.78 | 155,831 |
| 3 | 360–4000 | 90.62 | 154,539 |
| 4 | 390–4000 | 89.14 | 152,710 |
| 5 | 420–4000 | 87.32 | 150,651 |
| 6 | 450–4000 | 85.36 | 148,197 |

In the TABLES 1 and 2, the counting rate vs. the counting efficiency, the counting rate vs. the corrected counting efficiency, and the corrected counting rate vs. the corrected counting efficiency are respectively represented by the regression equations (1), (2) and (3).

Numerical calculation with respect to the regression equations (1), (2) and (3) by using the values in the TABLES 1 and 2 derives the following regression equations.

$$n = -0.34E^2 + 1,345.79E + 36,836.02 \qquad (5)$$

$$n = -1.35E^2 + 1,167.25E + 26,806.81 \qquad (6)$$

$$f_2 n = 17.90E^2 - 2,151.31E + 202,496.33 \qquad (7)$$

Using the equation (7), counting rate of a sample at counting efficiency of 100% is 166,365.33.

The counting ratio R of standard in two measuring regions and the correction factor $f_3$ meaning the ratio of an assayed value to a value at E=100% are listed in TABLE 3.

TABLE 3

| No. | Counting ratio R | Correction factor $f_3$ |
|---|---|---|
| 1 | 0.7889 | 1.1289 |
| 2 | 0.7502 | 1.1156 |
| 3 | 0.6115 | 1.0689 |
| 4 | 0.3309 | 0.8986 |
| 5 | 0.1876 | 0.7561 |

The following regression equation is obtained from the TABLE 3.

$$f_3 = 0.0397R^2 + 0.2528R + 0.8813 \qquad (8)$$

If a value R is 0.7864, $f_3$ is equal to 1.1281. By multiplying the value of 166,365.33 by 1.1281, the final radioactivity is determined to be 187,676 dpm. Based on the fact that 187,676 dpm is very close to an expected value of 187,100 dpm, it is proved that measurement accuracy in this technique is excellent.

Figure 4B:
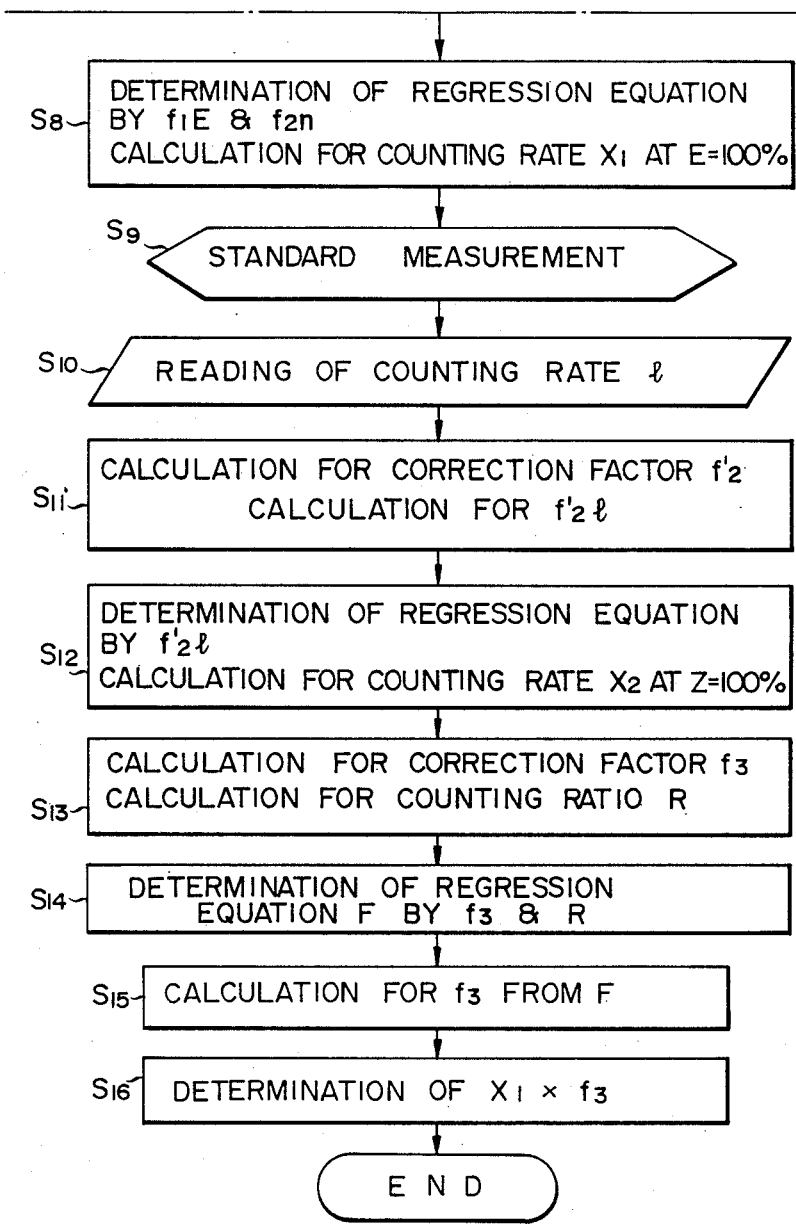

A flow chart of software concerning a data processor which is installed inside the liquid scintillation counter is shown in FIG. 4, its steps being explained as follows.

$S_1$: Measuring regions $N_l$-$N_u$ ... $N_m$-$N_u$ and dpm of standard are inputted.

$S_2$: Standard is measured for 1 min.

$S_3$: Counting efficiencies $E_l$ ... $E_m$ of standard are calculated.

$S_4$: Correction factor $f_1$ is calculated from ratio of $E_l$ to $E_m$, and then corrected counting efficiencies $f_1E_l$ ... $f_1E_m$ are obtained.

$S_5$: Sample for radioactivity to be determined is measured.

$S_6$: Counting rates $n_l$ ... $n_m$ are read.

$S_7$: Correction factor $f_2$ is calculated, and then corrected counting rates $f_2n_l$ ... $f_2n_m$ are obtained.

$S_8$: Regression equation representing relation between $f_1E$ and $f_2n$ is determined, and then counting rate $X_1$ at E=100% is calculated.

$S_9$: Standards are measured for 1 min.

$S_{10}$: Counting rates $l_1$ ... $l_m$ are read.

$S_{11}$: Correction factor $f_2'$ is calculated by $l_m/1_l$, and then corrected counting rates $f_2'l_1$ ... $f_2'l_m$ are obtained.

$S_{12}$: Regression equation is determined using $f_2'l$, and then counting rate $X_2$ at E=100% is calculated.

$S_{13}$: Correction factor $f_3$ and counting ratio are calculated.

$S_{14}$: Regression equation F representing relation between $f_3$ and R is determined.

$S_{15}$: Correction factor $f_3$ of sample is calculated using regression equation F.

$S_{16}$: Radioactivity of sample is determined by $X_1 \times f_3$.

The above is each step of program in the invention. The steps which are necessary in this invention and are lacking in the conventional automatic efficiency tracing technique are $S_4$, $S_7$ and total steps from $S_9$ to $S_{16}$.

The liquid scintillation measurement method has been developed regarding tritium as the most important nuclide. Usually tritium is measured with the external standard method. Since this invention makes it possible to determine radioactivity of tritium, the following advantages are obtained.

As the radioactivity of quenched tritium sample can't be measured with the conventional automatic efficiency tracing technique, the external standard method was an essential means for tritium measurement. It is a technique that finds radioactivity through gamma ray irradiation to a sample as a quenching correction method. The method requires installation of a gamma ray source, a device which drives the source from a storing site to an irradiating one, a surrounding electric circuit, and lead shield inside the liquid scintillation counter. This invention necessitates no external standard method having various drawbacks because radioactivity of tritium can be measured with the invention. Hence, the mechanism, material and device used for the external standard method come to be unnecessary. The efficiency tracing technique makes the liquid scintillation counter simpler and much less expensive. The counter doesn't need the driving device which often goes wrong so that it rarely causes trouble.

Measurement accuracy of tritium is much superior to that in the external standard method whose measured results are dependent on the volume of tritium sample. The efficiency tracing technique is independent entirely upon the sample volume.

The use of both this invention and the conventional efficiency tracing technique makes it possible to obtain radioactivities with respect to all pure beta, beta-gamma emitters and mixed nuclides, and extremely enhances ability of the liquid scintillation counter.

What is claimed is:

1. A method of determining radioactivity of low energy beta emitters using liquid scintillator, which comprises:

obtaining counting efficiencies corrected by working a correction factor on counting efficiencies of the standard which are simultaneously obtained from measuring regions defined by lower and upper levels of a pulse height analyzer using a standard whose maximum counting efficiency is equal to or less than 85% in measuring regions to be used;

obtaining counted values corrected by working a correction factor on counted values of a sample for radioactivity to be measured which are simultaneously obtained in the measuring regions;

determining a regression equation using the corrected counting efficiencies and the corrected counted values; and making correction of counted value at counting efficiency 100% of a regression equation by a correction factor obtained by standards.

2. A method of determining radioactivity as recited in claim 1 wherein said method is performed by computer processes comprising:

calculating counting efficiencies corrected by a correction factor determined by counting efficiencies of standard;

calculating counted values corrected by a correction factor determined by counted values of sample;

determining a regression equation by corrected counting efficiencies and corrected counted values;

calculating counted value of sample at counting efficiency 100% of regression equation; and making correction of counted value at counting efficiency 100% regression equation by correction factor obtained by standards.

3. A method determining radioactivity as recited in claim 2 wherein;

correction factor which works on counting efficiencies of standard is determined by ratio of two out of counting efficiencies obtained in measuring regions, correction factor which works on counted values of sample is determined by ratio of two out of counted values obtained in measuring regions, and correction factor obtained from standards is ratio of radioactivity of the standards to counted value at counting efficiency 100% of regression equaltion of the standards.

4. A method determining radioactivity as recited in claim 1 wherein;

correction factors are values in limits which are equal to or more than 0.5 and equal to or less than 2.0, and the correction factors are functions of quenching strength of sample.

* * * * *